(12) United States Patent
Tashiro

(10) Patent No.: US 6,946,536 B2
(45) Date of Patent: Sep. 20, 2005

(54) SILICON-CONTAINING COPOLYMER AND PROCESS FOR PRODUCING THE SAME

(75) Inventor: Yuji Tashiro, Ogasa-gun (JP)

(73) Assignee: Clariant Finance (BVI) Limited, Tortola (VG)

(*) Notice: Subject to any disclaimer, the term of this patent is extended or adjusted under 35 U.S.C. 154(b) by 152 days.

(21) Appl. No.: 10/399,928

(22) PCT Filed: Mar. 14, 2002

(86) PCT No.: PCT/JP02/02417
§ 371 (c)(1),
(2), (4) Date: Apr. 24, 2003

(87) PCT Pub. No.: WO02/081553
PCT Pub. Date: Nov. 17, 2002

(65) Prior Publication Data
US 2004/0030083 A1 Feb. 12, 2004

(51) Int. Cl.$^7$ .................. C08G 77/60; C08G 77/62
(52) U.S. Cl. ............. 528/35; 106/287.11; 106/287.13
(58) Field of Search ............ 528/35; 106/287.11, 106/287.13

(56) References Cited

U.S. PATENT DOCUMENTS

| | | | |
|---|---|---|---|
| 3,655,615 A | | 4/1972 | Bush et al. |
| 4,678,688 A | * | 7/1987 | Itoh et al. .................. 427/387 |
| 5,250,648 A | | 10/1993 | Huggins |
| 5,596,062 A | | 1/1997 | Tashiro et al. |

FOREIGN PATENT DOCUMENTS

| | | |
|---|---|---|
| JP | 2175726 | 7/1990 |
| JP | 5170914 | 7/1993 |
| JP | 8245880 | 9/1996 |
| JP | 81231727 | 9/1996 |
| JP | 9188765 | 7/1997 |
| JP | 9188851 | 7/1997 |

* cited by examiner

*Primary Examiner*—Margaret G. Moore
*Assistant Examiner*—Marc S Zimmer
(74) *Attorney, Agent, or Firm*—Alan P. Kass

(57) ABSTRACT

A silicon-containing copolymer which comprises units represented by the general formulae (I) and (II) as essential units and ones represented by the general formulae (III) to (VII) as optional units and has a number average molecular weight of 500 to 1,000,000, $$—(—R^1R^2Si—A—)_p— \qquad (I)$$

$$—(—R^3R^4Si—R^7—SiR^5R^6—)_q— \qquad (II)$$

$$—(—R^8Si—A—)_r— \qquad (III)$$

$$—(—R^9(H)Si—A—)_s— \qquad (IV)$$

$$—(—R^1R^2Si—NH—R^{10}—NH—)_t— \qquad (V)$$

$$—(—R^8Si—NH—R^{10}—NH—)_u— \qquad (VI)$$

$$—(—R^9(H)Si—NH—R^{10}—NH—)_w— \qquad (VII)$$

wherein A is NH or oxygen, the proportions of these satisfying the relationship $0.01 \leq \text{Si—O}/(\text{Si—N}+\text{Si—O}) \leq 0.99$.

12 Claims, No Drawings

SILICON-CONTAINING COPOLYMER AND PROCESS FOR PRODUCING THE SAME

TECHNICAL FIELDS

The present invention relates to a novel silicon-containing copolymer, a production method thereof and a film which is formed by this novel silicon-containing copolymer, is excellent in heat resistance and transparency, has a low relative dielectric constant, and is excellent in flexibility and mechanical strength. This novel silicon-containing copolymer can be widely used for some parts where heat resistance, transparency and further low relative dielectric constant are required such as a heat resisting coating, a dielectric layer for plasma display panel (PDP), an interlayer dielectric film for semiconductor, etc. besides the film. Particularly, since the silicon-containing copolymer of the present invention is excellent in transparency after curing in the air and has a low relative dielectric constant, it is suitable for a material forming a dielectric layer for PDP.

BACKGROUND ART

Concerning the heat-resistant polymer, fluorine-containing materials and aromatic/heterocyclic polymers such as polyimidebendazol, aromatic polyamide and polyimide have been studied since a silicone was synthesized by Rocho, et al. Further, in recent years, as astronautical and aeronautical fields are developing, a demand for heat resistance is increasing higher. As a result, research has been progressed in aromatic/heterocyclic polymers, and an improvement of aromatic polyimide is being proceeded. Besides, organic metal polymers, the main chain of which comprises metal elements such as Si, Ti and B, and O, N, etc. such like polyborosiloxane and polytitanosiloxane, are being studied.

Recently an improvement of heat resistance is being demanded in various heat-resistant and insulating material fields. For example, as one of the uses of heat-resistant and insulating materials, a field of a rotating machine such as a generator, a high voltage alternating current motor, a direct current motor for industrial use, an electric train motor, etc. are exemplified. Classified ones in these high voltage rotating machines have a tendency to be made large volume or high voltage and therefore downsizing and high heat resistance thereof are also required. In addition to that, the specific property required heat resistance in these fields is 400° C. or higher in the air. Additionally, an electric insulating property, flexibility, a mechanical property, etc. are also required together with the heat resistance.

As the other applications of heat-resistant and insulating materials, there are raised various ones including an insulating or dielectric layer of a display device such as a dielectric layer for PDP, an interlayer dielectric for a semiconductor, materials for semiconductor elements such as Pre-Metal-Dielectric Layer (PMD) material used suitably upon formation by a low temperature process of 600° C., a front panel of display equipment, a heat resisting film and a heat resisting sheet which are used for a various applications, a heat resisting coating, a plastic optical fiber, an electric wire sheathing, etc. In these applications, optical and electric properties such as transparency, a dielectric property, etc. are also required in addition to heat resistance, flexibility and mechanical property described above. Further, there are being tried applications as materials in the fields of ceramic composite materials, ceramic-metal adhesives, hybrid products with a ceramic material such as $Al_2O_3$, MgO, etc., and hybrid products by blending other polymers. However, the heat resistance temperature being made practicable is 300° C. or less concerning to an organic polymer in the heat-resistant polymers being currently used.

On the other hand, organic metal polymers such as silicone resin, polyborosiloxane resin, etc. have high heat resistance of 500° C. or higher since the heat stability of the polymers is high. However compared to organic polymers of which molecular structure is linear structure with less branches, the organic metal polymers have network structure with many branches to form gigantic three-dimensional network structure by the dehydrogenation condensation reaction between an OH group and another OH group or an oxidation reaction. Consequently the flexibility of the organic metal polymers got poor and then the use of the organic metal polymers has been limited.

Therefore in order to improve such defects of the organic metal polymers, hybridization of an organic resin and an inorganic material or the like are being tried. For example, block copolymerized silazane consisting of an inorganic polysilazane part and an organic polysilazane part is being proposed (for example, Japanese Patent Publication Laid-open No. Hei 2-175726). However such hybrid polymers have such problems as insufficient mechanical property etc. and were not still in a satisfactory level.

Considering such situation, the present inventors developed a high heat-resistant silicon-containing copolymer comprising silazane copolymer containing particular recurring units (Japanese Patent Publication Laid-open No. Hei 8-231727 and Japanese Patent Publication Laid-open No. Hei 9-188765). This silicon-containing copolymer is an organic metal polymer which has the heat resistance of 400° C. or higher and is excellent in a mechanical property and flexibility. In addition, its production is easy and the copolymer has such characteristic as the transparent polymer being formed upon curing in nitrogen. Therefore, it is a material that is useful for high heat-resistant optical use. However there is a problem that the cured polymer is discolored when cured in the air and it is difficult to obtain a film which is good in transparency. Because of this, it is necessary to cure the silicone-containing copolymer in nitrogen in order to obtain a transparent cured polymer, and occasionally it is difficult to apply for the some uses from the viewpoints of process cost and mass production.

Because of this, in order to increase the usefulness of the silicone-containing copolymer more, it is a further theme to develop a silicon-containing copolymer which can realize a comparable or higher transparency even when curing-treatment is made in the air without losing a heat resistance to/than that when curing-treatment is made in nitrogen. As a silicon-containing copolymer, it is also required to provide with the polymer which is not only excellent in heat resistance, a mechanical property, flexibility and transparency but also is low in a relative dielectric constant.

The object of the present invention is to provide a silicon-containing copolymer which solves the above described problems, it means, which has heat resistance of 400° C. or higher, is excellent in mechanical strength and flexibility, has high and colorless transparency even when cured in the air and also a low relative dielectric constant and to provide a production method thereof.

And another object of the present invention is to provide a film which is formed with the silicon-containing copolymer having the aforementioned excellent properties and is not only excellent in heat resistance, transparency, mechanical strength and flexibility but also low in a relative dielectric constant.

DISCLOSURE OF THE INVENTION

After being dedicated to examine, the present inventors have found that the discoloration upon curing in the air of the polymer which was proposed in aforementioned Japanese Patent Publication Laid-open No. Hei 8-231727 and Japanese Patent Publication Laid-open No. Hei 9-188765 is caused mainly by diamine used upon the production of the polymer. It means that the diamine is used as a denaturing agent upon polymer production in a silicon-containing copolymer that was previously developed and a silazane bond is introduced in a polymer by the use of diamine. We reached to the presumption that at this moment the association state of the introduced diamine component after curing influences on the coloration of the cured polymer and the discoloration of the polymer occurs when cured in the air. And we reached to the think that it became possible that the discoloration upon curing in the air was suppressed by controlling the state of diamine. In order to control the state of diamine, it is thought to reduce the denatured amount of diamine and to reduce the reaction temperature as a concrete measure. However, diamine is a component for making silicon-containing copolymer linear and for controlling a degree of polymerization. If the amount of diamine is reduced, it is estimated that the degree of polymerization is reduced and the physical properties such as heat resistance and strength of the polymer are deteriorated. It is found that by introducing Si—O bond which is likely to be polymerized relatively in linear newly and reducing the denatured amount of diamine and the reaction temperature in order to make up for aforementioned point, a transparent film can be obtained upon curing even at 400° C. in the air and besides increase of transparency and decrease of relative dielectric constant are observed, and attaining the present invention. By the present invention, an industrial usefulness of a silicon-containing copolymer is remarkably improved.

It means that the silicon-containing copolymer of the present invention is characterized by comprising the following constitution.

(1) A silicon-containing copolymer having a number average molecular weight of 500 to 1,000,000 and comprising at least structural units represented by the general formulae (I) and (II):

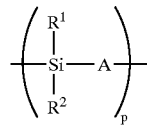
(I)

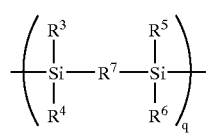
(II)

wherein $R^1$, $R^2$, $R^3$, $R^4$, $R^5$ and $R^6$ independently represent an alkyl group, an alkenyl group, a cycloalkyl group, an aryl group, an aralkyl group, an alkylamino group, an alkylsilyl group or an alkoxyl group; $R^7$ is a divalent group; A is NH or O; and the structural units (I) and (II) are arranged at random, and their molar ratios p and q satisfy the following formula:

$$q/(p+q)=0.01 \text{ to } 0.99$$

and the ratio of the number of Si—O bonds to that of Si—N bonds in the polymer satisfies the following formula:

$$\text{Si—O}/(\text{Si—N}+\text{Si—O})=0.01 \text{ to } 0.99.$$

(2) A silicon-containing copolymer according to the item 1 described above, wherein the silicon-containing copolymer further comprises at least one of structural units represented by the general formulae (III) and (IV):

(III)

(IV)

wherein $R^8$ and $R^9$ independently represent an alkyl group, an alkenyl group, a cycloalkyl group, an aryl group, an aralkyl group, an alkylamino group, an alkylsilyl group or an alkoxyl group; A is NH or O; and the structural units (I) to (IV) in the polymer are arranged at random, and their molar ratios p, q, r and s satisfy the following formula:

$$q/(p+q+r+s)=0.01 \text{ to } 0.99.$$

(3) A silicon-containing copolymer according to the item 1 or 2 described above, wherein the silicon-containing copolymer further comprises at least one of structural units represented by the following general formulae (V), (VI) and (VII):

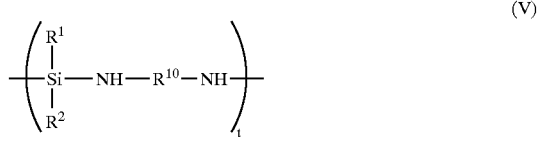
(V)

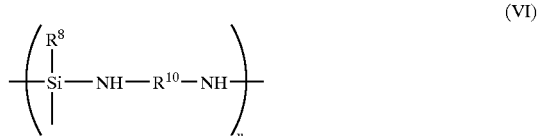
(VI)

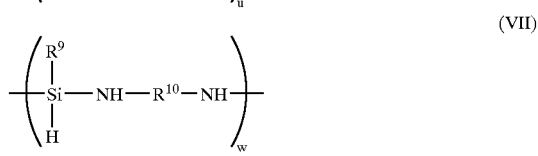
(VII)

wherein $R^1$, $R^2$, $R^8$ and $R^9$ independently represent an alkyl group, an alkenyl group, a cycloalkyl group, an aryl group, an aralkyl group, an alkylamino group, an alkylsilyl group or an alkoxyl group, $R^{10}$ is a divalent aromatic group, and the structural units (V) to (VII) are arranged at random.

(4) A silicon-containing copolymer according to any one of the items 1 to 3 described above, wherein said divalent aromatic group is an aralkylene group, a naphthylene group or a group represented by the general formula (A):

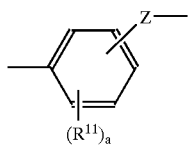
(A)

wherein $R^{11}$ is a halogen atom or a lower alkyl group, a is an integer of 0 to 4, and Z is a direct bond or a group represented by the general formula (B):

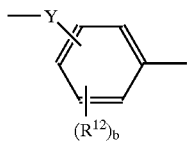
(B)

wherein $R^{12}$ is a halogen atom or a lower alkyl group, b is an integer of 0 to 4, and Y is a direct bond or a divalent group.

Further a production method for the silicon-containing copolymer of the present invention is characterized by comprising the following constitution.

(5) A production method for the silicon-containing copolymer described in the item 1 above, which comprises steps of allowing a mixture containing at least an organohalosilane represented by the following general formula (VIII) and a disilyl compound represented by the following general formula (IX) to react with water dispersed in a suitable solvent and thereafter allowing the unreacted halosilane to be completely reacted by making the reaction solution to react with ammonia:

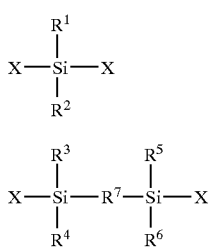

wherein $R^1$, $R^2$, $R^3$, $R^4$, $R^5$ and $R^6$ independently represent an alkyl group, an alkenyl group, a cycloalkyl group, an aryl group, an aralkyl group, an alkylamino group, an alkylsilyl group or an alkoxyl group, $R^7$ is a divalent group, and X is a halogen atom.

(6) A production method for a silicon-containing copolymer according to the item 5 described above, wherein the mixture containing an organohalosilane represented by the general formula (VIII) and a disilyl compound represented by the general formula (IX) further comprises organohalosilane(s) represented by the following general formula (X) and/or (XI) to produce the silicon-containing copolymer described in the item 2 above:

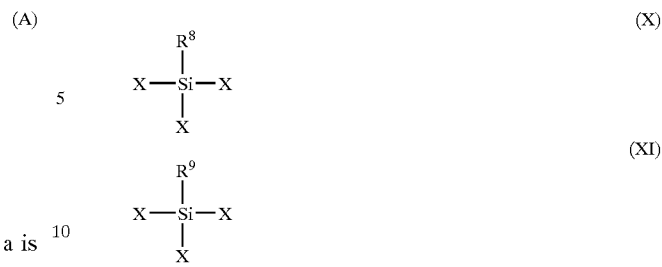

wherein $R^8$ and $R^9$ independently represent an alkyl group, an alkenyl group, a cycloalkyl group, an aryl group, an aralkyl group, an alkylamino group, an alkylsilyl group or an alkoxyl group, and X is a halogen atom.

(7) A production method for the silicon-containing copolymer described in the item 3 described above, which comprises steps of allowing a mixture containing an organohalosilane represented by the general formula (VIII) and a disilyl compound represented by the general formula (IX) to react in a first step with a diamine represented by the following general formula (XII), then allowing the reaction solution to react with water dispersed in a suitable solvent, and thereafter allowing the unreacted halosilane to be completely reacted by making it to reaction with ammonia:

$$NH_2\text{---}R^{10}\text{---}NH_2 \qquad (XII)$$

wherein $R^{10}$ is a divalent aromatic group.

(8) A production method for a silicon-containing copolymer according to the item 6 or 7 described above, wherein the mixture containing an organopolyhalosilane represented by the general formula (VIII) and a disilyl compound represented by the general formula (IX) further comprises organohalosilane(s) represented by the general formula (X) and/or (XI).

Furthermore the film of the present invention is characterized in that it comprises the following constitution.

(9) A film comprising the silicon-containing copolymer described in any one of the items 1 to 4 described above.

By the way according to the present invention, the following production methods for a silicon-containing copolymer are further provided as a preferable embodiment.

(i) A production method for a silicon-containing copolymer described in the aforementioned item 4 which is characterized in that the divalent group of $R^7$ is an aralkylene group or a naphthylene group in the general formula (IX) or a group represented by the aforementioned general formula (A).

(ii) A production method for a silicon-containing copolymer described in aforementioned item 5 which is characterized in that the divalent aromatic group of $R^{10}$ in the general formula (XII) is an aralkylene group or a naphthylene group or a group represented by the aforementioned general formula (A).

Further according to the present invention, the following polymers and production methods thereof are proposed as a preferable embodiment.

① Aforementioned silicon-containing copolymers wherein $R^1$ to $R^6$, $R^8$ and $R^9$ in the structural unit of the aforementioned general formulae (I) to (VII) represent independently a methyl group or a phenyl group.

② Aforementioned silicon-containing copolymers wherein $R^7$ and $R^{10}$ in the structural unit of the aforementioned general formulae (II), and (V) to (VII) represent an arylene group.

③ Production methods for the aforementioned silicon-containing copolymer wherein $R^1$ to $R^6$, $R^8$ and $R^9$ in the structural unit of the aforementioned general formulae (VIII) to (XI) represent independently a methyl group or a phenyl group.

④ Production methods for the aforementioned silicon-containing copolymer, wherein $R^7$ and $R^{10}$ in the compound of the aforementioned general formulae (IX) and (XII) represent an arylene group.

⑤ Production methods for the aforementioned silicon-containing copolymer, wherein X in the compound of the aforementioned general formulae (VIII) to (XI) is a Cl atom.

As usable applications of the silicon-containing copolymer of the present invention, there can be raised a film such as a film for coating including hard coat film, a film single body, and so on and besides the following usable embodiments can be exemplified.

(a) A dielectric layer for a PDP back face plate and a PDP front face plate, a material for PDP ribs (insulation material) and a PDP vacuum sealing agent, which are formed by the silicon-containing copolymer described above.

(b) An interlayer dielectric film of semiconductor comprising the aforementioned silicon-containing copolymer.

(c) A coating comprising the aforementioned silicon-containing copolymer.

(d) A front face display plate of a display device comprising the aforementioned silicon-containing copolymer.

(e) A PMD material usable in low temperature process at 600° C. comprising the aforementioned silicon-containing copolymer.

(f) An optical fiber comprising the aforementioned silicon-containing copolymer.

(g) An adhesive agent comprising the aforementioned silicon-containing copolymer.

(h) A wire sheathing comprising the aforementioned silicon-containing copolymer.

(i) A composite material comprising the aforementioned silicon-containing copolymer and ceramics.

DETAILED EXPLANATION OF THE INVENTION

The present invention is explained in details concretely in the following.

The silicon-containing copolymer of the present invention is characterized by having the structural units represented by the aforementioned general formulae (I) and (II), according to the circumstances (I) to (IV) or (I) to (VII) and by having a number average molecular weight of the range from 500 to 1,000,000. The silicon-containing copolymer of the present invention has the structural units represented by the aforementioned general formula (II) and optionally (V) to (VII). As a result, a bonding energy goes up because of a C=C bond, linearity of the polymer proceeds by the introduction of a two functional group ($R^7$, occasionally $R^{10}$), its heat resistance is 400° C. or more because of high oxidation stability brought by Si bonding, of course, besides it has flexibility together. Further it has high mechanical strength because of having the structural unit of the aforementioned general formula (III), occasionally (VI) by the introduction of three functional groups. In addition, because of the existence of —NH— group in the aforementioned general formulae (I), (III), and (V) to (VII) and Si—H in the aforementioned general formulae (IV) and (VII), curing proceeds by heating and then one with heat resistance and high strength can be obtained. Furthermore because of having a Si—O bond, a cured polymer is colorless and excellent in transparency, besides even if cured in the air, it is colorless and a highly transparent cured polymer can be formed. Curing control can be made easily when there exist in the polymer the structural units represented by the general formulae (IV) and (VII) having Si—H and having the structural units represented by the general formulae (I), (III), (IV) and (V) to (VII) having —NH—.

The silicon-containing copolymer of the present invention is characterized by having the aforementioned structural units represented by the general formulae (I) and (II), according to the circumstances the general formulae (I) to (IV) or the general formulae (I), (II) and (V) to (VII) or the general formulae (I) to (VII), and particularly having Si—O bond in the structural units represented by the general formula (I) or the formulae (III) and (IV). By the way the bonding order of structural units represented by the general formulae (I) to (VII) is random and ratios of each structural element, p, q, r, and s or p, q, r, s, t, u, and w can be taken in the range described below.

$p/(p+q+r+s)$=0.01 to 0.99, preferably 0.1 to 0.5
$q/(p+q+r+s)$=0.01 to 0.99, preferably 0.2 to 0.75
$r/(p+q+r+s)$=0 to 0.99, preferably 0.1 to 0.5
$s/(p+q+r+s)$=0 to 0.99, preferably 0.01 to 0.2
or
$p/(p+q+r+s+t+u+w)$=0.01 to 0.99, preferably 0.1 to 0.5
$q/(p+q+r+s+t+u+w)$=0.01 to 0.99, preferably 0.1 to 0.75
$(t+u+w)/(p+q+r+s+t+u+w)$=0 to 0.99, preferably 0.01 to 0.5
$(s+w)/(p+q+r+s+t+u+w)$=0 to 0.99, preferably 0.01 to 0.2
$(r+u)/(p+q+r+s+t+u+w)$=0 to 0.99, preferably 0.1 to 0.75

Further the ratio of a Si—O bond and a Si—N bond in the polymer is

Si—O/(Si—N+Si—O)=0.01 to 0.99, preferably 0.1 to 0.95.

Next the production method of the silicon-containing copolymer of the present invention is explained. The production method of the present invention is characterized in that a mixture of organohalosilane represented by the aforementioned general formula (VIII) and disilyl compounds represented by the aforementioned general formula (IX), or the mixture further comprising organohalosilane represented by the aforementioned general formula (X) and/or general formula (XI) if necessary is reacted with diamine represented by the aforementioned general formula (XII), if necessary, first, and then is reacted with water which is dispersed in an adequate solvent, and thereafter the reaction solution is subjected to reaction with ammonia to permit the unreacted halosilane to be completely reacted.

In the organopolysilane represented by the general formula (VIII), (X) or (XI) which is used as a starting raw material when producing the silicon-containing copolymer of the present invention, $R^1$, $R^2$, $R^8$ and $R^9$ are selected from groups consisting of an alkyl group, an alkenyl group, a cycloalkyl group, an aryl group, an aralkyl group, an alkylamino group, an alkylsilyl group and an alkoxyl group, and usually an alkyl group having 1 to 7 carbon atoms, preferably 1 to 5 carbon atoms and more preferably 1 to 2 carbon atoms, an alkenyl group having 2 to 7 carbon atoms, a cycloalkyl group having 5 to 7 carbon atoms, and an aryl group are used. X is usually a fluorine atom, a chlorine atom, a bromine atom or a iodine atom, preferably a chlorine. As the aryl group, a phenyl group, a tolyl group, a xylyl group, a cumenyl group, a benzyl group, a phenethyl group, an α-methylbenzyl group, a benzhydryl group, a trityl group, a styryl group, a cinnamyl group, a biphenyl group, a naphthyl group, etc. can be used. As the alkylsilyl group (mono, di and tri substituted compounds), the alkylamino group (mono and di substituted compounds), and the alkoxyl group, one having 1 to 7 carbon atoms is usually used. $R^1$ and $R^2$ may be the same or different each other. Diphenyldichlorosilane is preferred as the compound represented by the general formula (VIII) described above, phenyltrichlorosilane is preferred as the compound represented by the general formula (X) described above and methyldichlorosilane is preferred as the compound represented by the general formula (XI) described above.

On the other hand, $R^3$ to $R^6$ of a disilyl compound represented by the general formula (IX) which is used as a starting raw material when producing a silicon-containing copolymer in the present invention are selected from groups consisting of an alkyl group, an alkenyl group, a cycloalkyl group, an aryl group, an aralkyl group, an alkylamino group, an alkylsilyl group and an alkoxyl group as same as the case of $R^1$, $R^2$, $R^8$ and $R^9$ of the general formulae (VIII), (X) and (XI), and X represents a halogen atom. The concrete examples of these groups or atoms can be the similar to those in $R^1$, $R^2$, $R^8$ and $R^9$ in the organohalosilanes represented by the general formula (VIII), (X) and (XI). As the divalent group of $R^7$, divalent aromatic groups are preferred such as an aralkylene group, a naphthylene group or a group represented by the general formula (A) described above. As $R^7$, an alkylene group, an alkenylene group, a cycloalkylene group, an arylene group, an alkylimino group o an alkylsilylene group are exemplified concretely and then an arylene group is a preferable group.

And then, a phenylene group, a tolylene group, a xylylene group, a benzylidene group, a phenethylidene group, a α-methylbenzylidene group, a cinnamylidene group, a naphthylene group, etc. can be exemplified as the arylene group. As the compound represented by the general formula (IX), 1,4-bis(dimethylchlorosilyl)benzene, etc. are preferable compounds concretely.

In the method of the present invention, first of all, the mixture of organohalosilane and a disilyl compound described above is reacted with diamine represented by the general formula (XII) $NH_2$—$R^{10}$—$NH_2$ if necessary. $R^{10}$ in the general formula (XII) is a divalent aromatic group and an aralkylene group, a naphthylene group or the group represented by the general formula (A) described above is a preferable group. Diamines represented by the general formula (XII) can be exemplified in following:

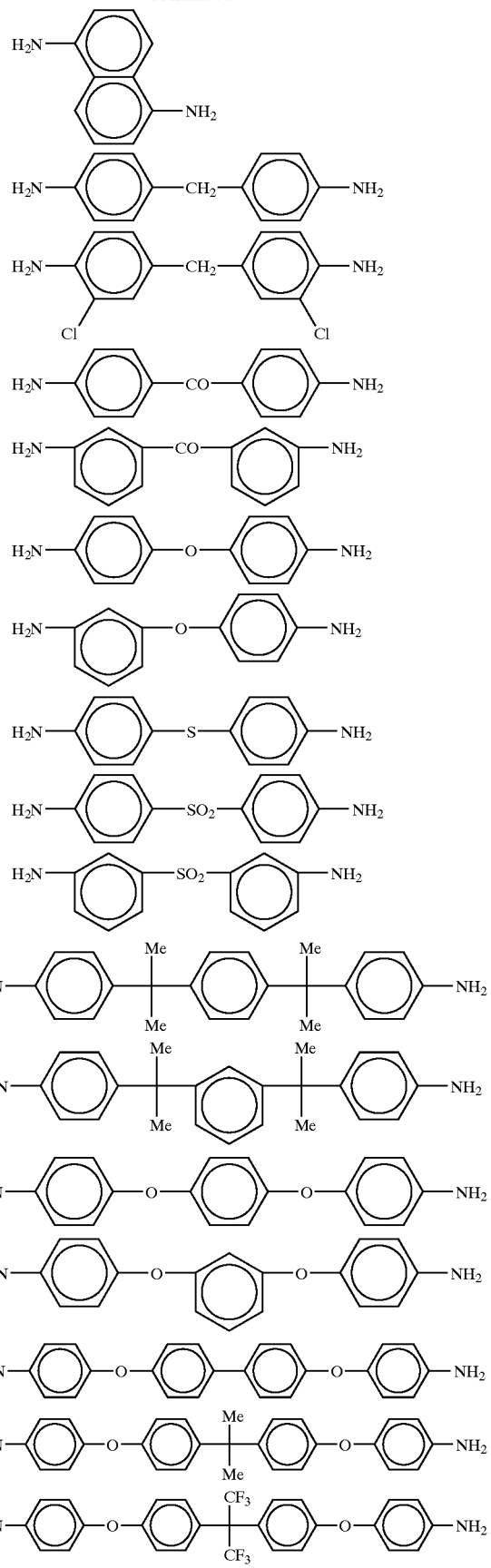

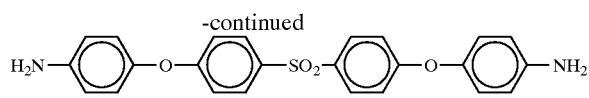

As shown in the concrete examples described above, an arylene group such as a phenylene group and various divalent aromatic groups such as a biphnylene group can be exemplified as $R^{10}$ in the general formula (XII) and an arylene group is a preferable group as $R^{10}$. Although diamines are exemplified above, these are just preferable examples and diamines represented by the general formula (XII) are not restricted in those described above. Among these diamines, para-phenylene diamine (p-PDA), meta-phenylene diamine (m-PDA), and diaminodiphenyl ether such as 4,4'-diphenyldiamino ether (oxydianiline, ODA) are preferable compounds.

As a reaction solvent, anyone of Lewis bases, non-reactive solvents or a mixture thereof may be used. In this case, as Lewis bases, tert-amines (for example, trialkylamine such as trimethylamine, dimethylethylamine, diethylmethylamine and triethylamine, pyridine, picoline, dimethylanilline and the derivatives thereof), sec-amines having a steric hindrance group, phosphine, stibine, arsine and the derivatives thereof, etc. (for example, trimethylphosphine, dimethylethylphosphine, methyldiethylphosphine, triethylphosphine, trimethyl-arsine, trimethylstibine, trimethylamine, triethylamine, etc.) can be exemplified. Among these, a base with low boiling point and less basic property than ammonia (for example, pyridine, picoline, trimethylphosphine, dimethylethylphosphine, methyldiethylphosphine, and trimethylphosphine) is a preferable Lewis base. Particularly pyridine and picoline are preferred from handling and economical points of view.

As a non-reactive solvent, hydrocarbon solvents such as aliphatic hydrocarbons, alicyclic hydrocarbons, aromatic hydrocarbons; halogenated hydrocarbons such as halogenated methane, halogenated ethane, halogenated benzene, etc., ethers such as an aliphatic ether and an alicyclic ether can be used. The preferable ones among these are halogenated hydrocarbons such as chloromethylene, chloroform, tetrachlorometane, bromoform, chloroethylene, chloroethylidene, trichloroethane, tetrachloroethane, ethers such as ethyl ether, isopropyl ether, ethylbutyl ether, butyl ether, 1,2-dioxyethane, dioxane, dimethyldioxane, tetrahydrofuran, tetrahydropyran, etc., hydrocarbons such as pentane, hexane, isohexane, methylpentane, heptane, isoheptane, octane, isooctane, cyclopentane, methylcyclopentane, cyclohexane, methylcyclohexane, benzene, toluene, xylene, ethylbenzene, N-methyl-2-pyrrolidone, diglyme, etc. Among these solvents, dichloromethane, xylene and N-methyl-2-pyrrolidone are preferable ones from the safety point of view. And pyridine/dichloromethane mixture solvent is also preferable one.

In the method of the present invention, at first organohalosilane(s) represented by the general formula (VIII) and if necessary the general formulae (IX) and (X) described above and a disilyl compound represented by the general formula (XI) are mixed in an organic solvent, followed by being reacted with diamine represented by the general formula (XII), if necessary. The mixing ratio of the organohalosilane(s) and the disilyl compound may be in the region of 1:99 to 99:1 in molar ratio, preferably 90:10 to 10:90, more preferably 80:20 to 40:60. The ratio of the both halosilicon compounds and the diamine used may be in the region of 100:0 to 10:90 in molar ratio, preferably 100:0 to 25:75, more preferably 100:0 to 40:60. The denatured amount of diamine is preferably made from 0 to 50 mol % relative to an ideal reaction amount of both halosilicon compounds. The concentration of the halosilicon compound in a solvent may be selected optionally, however the region from 1 to 25 weight % is preferred. The temperature may be any temperature so far as the reaction system is in a liquid state (typically −40° C. to 300° C.). The pressure is generally under normal pressure or imposed pressure and the imposed pressure by nitrogen is preferred.

Subsequent to the reaction between the halosilicon compounds and the diamine being made, or without reacting the halosilicon compounds with diamine, water dispersed in a proper solvent is added to the halosilicon compound and reacted to form a Si—O bond. As a solvent in which water is dispersed, the similar solvent to one employed upon the reaction with the above-described diamine can be used. Particularly pyridine and pycoline are preferred from the handling and economical points of view. In the reaction with water, the pouring speed of water into the reaction system influences on the formation of the polymer largely. When the pouring speed is higher, there is a case that the polymer formation is not made sufficiently. Water pouring speed would be preferable at 0.1 $molH_2O/min$ or lower. Furthermore the reaction temperature plays an important role for a formation of the polymer. The temperature of a hydrolysis reaction is usually −40° C. to 20° C., preferably −20° C. to 5° C. In the case that the reaction temperature is higher, there is a case that polymer formation is not made sufficiently.

Subsequent to the reaction with water being accomplished, ammonia is added and aminolysis reaction is made to permit halosilane to be completely reacted. The conditions such as a reaction solvent and temperature in this case are the same as those employed in reaction with diamine described above. The amount of ammonia added is determined by the amount of halogen atom remained at an unreacted state. It means that an ideal amount which is required for ammonolysis of a halosilicon compound can be calculated from the quantities of the added amine and water, however ammonia is used more than the ideal amount since ammonia may become excessive. The pressure is usually under normal pressure or imposed pressure, however the imposed pressure by nitrogen is preferred. HCl is generated in this reaction but it can be separated from the object substance by formation of a salt with a base such as triethylamine or ammonia. The copolymer and the by-produced ammonium chloride or amine salt are filtrated and the by-product is separated. Solvent is removed under reduced pressure from the filtrate to obtain the copolymer.

According to the method of the present invention, a novel silicon-containing copolymer can be obtained easily having structural units represented by the general formulae (I) and (II), according to circumstances the general formulae (I) to (IV), the general formulae (I), (II) and (V) to (VII), or the general formulae (I) to (VII) and having a number average molecular weight in the region of 500 to 1,000,000. BY the way, this polymer is soluble in a general organic solvent such as hydrocarbons, e.g. aliphatic hydrocarbons, alicyclic hydrocarbons and aromatic hydrocarbons, halogenated hydrocarbons, ethers, alcohols, esters, ketones, etc.

The copolymer obtained by the method of the present invention can be made a molding body having high heat resistance and excellent mechanical strength. For example, the copolymer is applied onto a glass substrate and baked, for example at 250° C. to 550° C. for 0.05 to 2.0 hours in the air or in inactive atmosphere such as nitrogen or argon atmosphere to form a coating film. In addition, a film single body can be obtained by tearing off the coating film from the glass substrate. These films are heat-resistant, excellent in mechanical characteristics, flexible, almost or completely colorless and excellent in transparency, and have low relative dielectric constant.

BEST MODE FOR PRACTICING THE INVENTION

The present invention will now be described more specifically by reference to Examples which, however, are not to be construed to limit the present invention in any way.

EXAMPLE 1

An inside of a reactor installed in a constant-temperature bath was replaced with dry nitrogen, and then a solution of 47 gr. (0.222 mol) of phenyltrichlorosilane ($PhSiCl_3$), 56 gr. (0.222 mol) of diphenyldichlorosilane ($Ph_2SiCl_2$), 3.8 gr. (0.033 mol) of methyldichlorosilane ($MeSiCl_2$) and 50 gr. (0.19 mol) of 1,4-bis(dimethylchlorosilyl)benzene in 1,000 ml of xylene was charged thereinto. Next the temperature of the reactor was set at $-5°$ C. When the temperature reached the determined temperature, 3.56 gr. (0.0178 mol) of DDE (diaminodiphenyl ether) was added into the reactor and the reaction was continued for 1 hour under stirring. After that, in order to break a salt of DDE with hydrochloric acid formed upon the reaction, 40 gr. of triethylamine solved in 500 ml of xylene was poured into the reactor. After pouring, it was kept stirring for 1 hour. Maintaining the temperature of the inside of reactor at $-5°$ C., a solution of 13.0 gr. (0.7222 mol) of water which was solved in 1,000 ml of pyridine was poured into the reactor at a speed of approximately 30 ml/min. At this time, a reaction of halosilane and water took place with pouring and the temperature inside of the vessel rose up to $-2°$ C. After finishing of pouring the mixture solution of water and pyridine, the stirring of the solution was kept for 1 hour. After that, in order to permit the unreacted chlorosilane to be reacted completely, ammonia was added to the solution at a speed of 2Nl/min for 10 minutes and was stirred. With addition of ammonia, the formation of white precipitation consisting of ammonium chloride was confirmed. After the reaction, unreacted ammonia was removed by introducing dry nitrogen. The solution was pressure-filtered in an atmosphere of nitrogen to obtain 2,300 ml of filtrate. The filtrate was solvent replaced under reduced pressure to obtain 105 gr. of slightly yellowish transparent resin with high viscosity.

A number average molecular weight of the obtained resin was 2,100. As a result of an IR spectrum analysis, an absorption based on a N—H group at wavelength of 3350 $cm^{-1}$; an absorption based on Si—H at wavelength of 2160 $cm^{-1}$; an absorption based on Si—Ph at wavelength of 1140 $cm^{-1}$; an absorption based on Si—O at wavelength of 1060–1100 $cm^{-1}$; an absorption based on Si—H and Si—N—Si at wavelength of 1020–820 $cm^{-1}$; an absorption based on C—H at wavelength of 3140, 2980, and 1270 $cm^{-1}$; and an absorption based on C—H of a benzene ring at wavelength of 810 and 780 $cm^{-1}$ were confirmed to be shown.

Further by analyzing a $^1$H-NMR (proton nuclear magnetic resonance absorption) spectrum, absorptions of δ7.2 ppm (br, $C_6H_6$), δ4.8 ppm (br, SiH), δ1.4 ppm (br, NH), and δ0.3 ppm (br, $SiCH_3$) were confirmed and from the result of the analysis, it was judged that the aimed substance was obtained.

Next, physical properties of this polymer were investigated as follows. That is, the polymer was applied in thickness of 50 microns onto glass substrates and cured under the condition of at 400° C. for 1 hour in the air and at 500° C. for 1 hour in nitrogen respectively. Then a transmittance and a relative dielectric constant of the cured polymer were measured. As a result, neither formation of crack nor release of the polymer took place, and these showed so much excellent transmission property and heat resistance such as 97% of transmittance and 550° C. or higher of heat-resistant temperature in all cases.

COMPARATIVE EXAMPLE

In accordance with the method described in Example 1 of the Japanese Patent Publication Laid-open Hei No. 9-188765, a silicon-containing polymer was synthesized, applied on glass substrates, cured, and tested in the same manner as Example 1.

It resulted that a transmittance of the polymer cured at 400° C. for 1 hour in the air was 40% and a transmittance of the polymer cured at 500° C. for 1 hour in nitrogen was 93%. A relative dielectric constant of the polymer cured at 400° C. for 1 hour in the air and of one cured at 500° C. for 1 hour in nitrogen were 3.08 and 3.0, respectively.

From the results of Example 1 and Comparative Example, by introduction of a Si—O bond, the transmittance in the air was drastically improved. The polymer obtained in Example 1 has heat resistance exceeding that of polyimide and higher transmittance than that of polymethylmethacrylate (PMMA). No polymer with such high heat resistance and light transmittance exists among existing resins and therefore various applications such as a high heat-resistant optical use, for example a dielectric layer of a plasma display etc., or the like are possible. And it is also possible to use the polymer as institution for a polyimide film since the polymer has excellent heat resistance and light transmittance and low relative dielectric constant compared with a polyimide film.

As an example of electric property, relative dielectric constants of cured polymer films in Example 1, wherein the curing was conducted at 400° C., 500° C. and 600° C. each for 1 hour in nitrogen, were measure and the readings were 2.72, 2.71 and 2.54, respectively, which were low relative dielectric constant. From these results of heat resistance, relative dielectric constant and transparency, the polymer of Example 1 can be applied for an interlayer dielectric film of semiconductor in the next generation and for a dielectric of PDP.

EXAMPLES 2 TO 4

Silicon-containing heat-resistant polymers were obtained in the same manner as Example 1 except for altering an amount of water added, a kind of diamine and a denatured amount of diamine to the conditions shown in Table 2.

Furthermore transmittance of the obtained polymers was measured in the same manner as Example 1 and the results are shown in Table 3.

TABLE 2

|  | Amount of water added (mol %) | Kind of diamine | denatured amount of diamine (mol %) | Number average molecular weight |
|---|---|---|---|---|
| Example 1 | 93.5 | DDE | 5.0 | 2,100 |
| Example 2 | 93.5 | p-PDA, | 5.0 | 2,050 |
| Example 3 | 93.5 | — | 0 | 2,200 |
| Example 4 | 70.0 | DDE | 25.0 | 1,800 |
| Comparative Example | 0 | p-PDA | 50.0 | 850 |

TABLE 3

|  | Light transmittance (%) | |
| --- | --- | --- |
|  | Curing at 400° C. for 1 hr in the air | Curing at 500° C. for 1 hr in N$_2$ |
| Example 1 | 97 | 97 |
| Example 2 | 97 | 97 |
| Example 3 | 97 | 97 |
| Example 4 | 95 | 96 |
| Comparative Example | 40 | 93 |

Further, in order to compare the relative dielectric constants of the polymers in Examples 1 to 4 with that of Comparative Example, each polymer was cured at 400° C. for 1 hour in the air and in nitrogen and the relative dielectric constants were measured. The results are shown in Table 4.

TABLE 4

|  | Relative dielectric constant | |
| --- | --- | --- |
|  | Curing at 400° C. for 1 hr in the air | Curing at 400° C. for 1 hr in N$_2$ |
| Example 1 | 2.75 | 2.72 |
| Example 2 | 2.74 | 2.73 |
| Example 3 | 2.73 | 2.74 |
| Example 4 | 2.83 | 2.81 |
| Comparative Example | 3.08 | 3.00 |

Effects of the Invention

As mentioned above, by the present invention, a polymer with high heat resistance up to about 550° C., high light transmittance up to about 97%, and a low relative dielectric constant, which is strong in mechanical strength and flexible can be obtained even by curing in the air. Therefore, no particular conditions are required such as nitrogen atmosphere and thus an industrial utilization at low cost in a various applications is made possible.

INDUSTRIAL APPLICABILITY

As the silicon-containing polymer of the present invention has high heat resistance, excellent transparency, and low relative dielectric constant, and is excellent in flexibility and mechanical strength, it can be preferably used as the materials for various kinds of films, a heat resisting coating, a dielectric layer for PDP, an interlayer dielectric film for semiconductor, etc. wherein those characteristics are required.

What is claimed is:

1. A silicon-containing copolymer having a number average molecular weight of 500 to 1000,000 and comprising at least structural units represented by the general formulae (I) and (II) and at least one of the structural units represented by general formulae (III) and (IV):

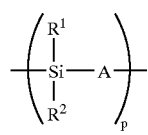
(I)

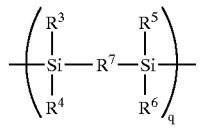
(II)

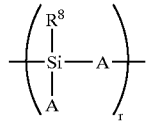
(III)

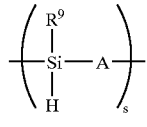
(IV)

wherein $R^1$, $R^2$, $R^3$, $R^4$, $R^5$ and $R^6$ independently represent an alkyl group, an alkenyl group, a cycloalkyl group, an aryl group, an aralkyl group, an alkylamino group, an alkylsilyl group or an alkoxyl group; $R^7$ represents an alkylene group, an alkenylene group, a cycloalkylene group, an arylene group, an alkylimino group, or an alkylsilylene group, $R^8$ and $R^9$ independently represent an alkyl group, an alkenyl group, a cycloalkyl group, an aryl group, an aralkyl group, an alkylamino group, an alkylsilyl group or an alkoxyl group; A is NH or O; and the structural units (I) to (IV) in the polymer are arranged at random, and their molar ratios p, q, r and s satisfy the following formula:

$$q/(p+q+r+s) = 0.01 \text{ to } 0.99$$

and the ratio of the number of Si—O bonds to that of Si—N bonds in the polymer satisfies the following formula:

$$\text{Si—O}/(\text{Si—N} + \text{Si—O}) = 0.01 \text{ to } 0.99.$$

2. The silicon-containing copolymer according to claim 1, wherein the silicon-containing copolymer further comprises at least one of structural units represented by the following general formulae (V), (VI) and (VII):

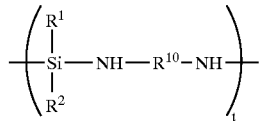
(V)

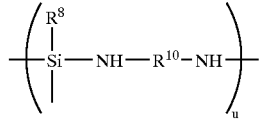
(VI)

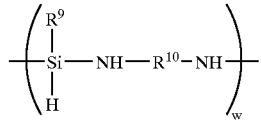
(VII)

wherein $R^1$, $R^2$, $R^8$ and $R^9$ independently represent an alkyl group, an alkenyl group, a cycloalkyl group, an aryl group, an aralkyl group, an alkylamino group, an alkylsilyl group or an alkoxyl group, $R^{10}$ is a divalent aromatic group, and the structural units (V) to (VII) are arranged at random.

3. A process for producing the silicon-containing copolymer described in claim 1, which comprises steps of allowing a mixture containing at least an organohalosilane represented by the following general formula (VIII) and a disilyl compound represented by the following general formula (IX) to react with water dispersed in a suitable solvent and thereafter allowing the unreacted halosilane to be completely reacted by making the reactor solution to react with ammonia:

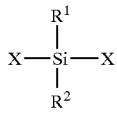  (VIII)

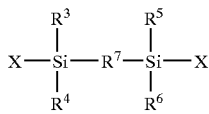  (IX)

wherein $R^1$, $R^2$, $R^3$, $R^4$, $R^5$ and $R^6$ independently represent an alkyl group, an alkenyl group, a cycloalkyl group, an aryl group, an aralkyl group, an alkylamino group, an alkylsilyl group or an alkoxyl group, $R^7$ is a divalent group, and X is a halogen atom.

4. The process for producing a silicon-containing copolymer according to claim 3, wherein the mixture containing an organohalosilane represented by the general formula (VIII) and a disilyl compound represented by the general formula (IX) further comprises organopolyhalosilane(s) represented by the following general formula (X) and/or the general formula (XI) to produce the silicon-containing copolymer described in claim 2:

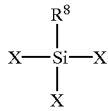  (X)

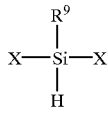  (XI)

wherein $R^8$ and $R^9$ Independently represent an alkyl group, an alkenyl group, a cycloalkyl group, an aryl group, an aralkyl group, an alkylamino group, an alkylsilyl group or an alkoxyl group, and X is a halogen atom.

5. A process for producing the silicon-containing copolymer described in claim 3, which comprises steps of showing a mixture containing an organohalosilane represented by the general formula (VIII) and a disilyl compound represented by the general formula (IX) to react in a first step of the reaction with a diamine represented by the following general formula (XII), then allowing the reaction solution to react with water dispersed in a suitable solvent, and thereafter allowing the unreacted halosilane to be completely reacted by making it to react with ammonia:

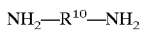  (XII)

wherein $R^{10}$ is a divalent aromatic group.

6. The process for producing a silicon-containing copolymer according to claim 4, wherein the mixture containing an organohalosilane represented by the general formula (VIII) and a disilyl compound represented by the general formula (IX) further comprises organopolyhalosilane(s) represented by the general formula (X) and/or the general formula (XI).

7. A film comprising the silicon-containing copolymer described in claim 1.

8. The silicon-containing copolymer according to claim 2, wherein said divalent aromatic group is an aralkylene group, a naphthylene group or a group represented by the general formula (A):

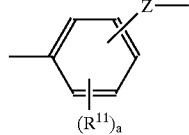  (A)

wherein $R^{11}$ is a halogen atom or a lower alkyl group, a is an integer of 0 to 4, and Z is a direct bond or a group represented by the general formula (B):

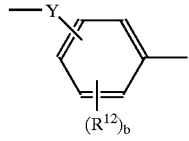  (B)

wherein $R^{12}$ is a halogen atom or a lower alkyl group, b is an integer of 0 to 4, and Y is a direct bond or a divalent group.

9. The process for producing a silicon-containing copolymer according to claim 5 wherein the mixture containing an organohalosilane represented by the general formula (VIII) and a disilyl compound represented by the general formula (IX) further comprises organopolysilane(s) represented by the general formula (X) and/or the general formula (XI).

10. A film comprising the silicon-containing copolymer described in claim 1.

11. A film comprising the silicon-containing copolymer described in claim 2.

12. A film comprising the silicon-containing copolymer described in claim 8.

* * * * *